UNITED STATES PATENT OFFICE.

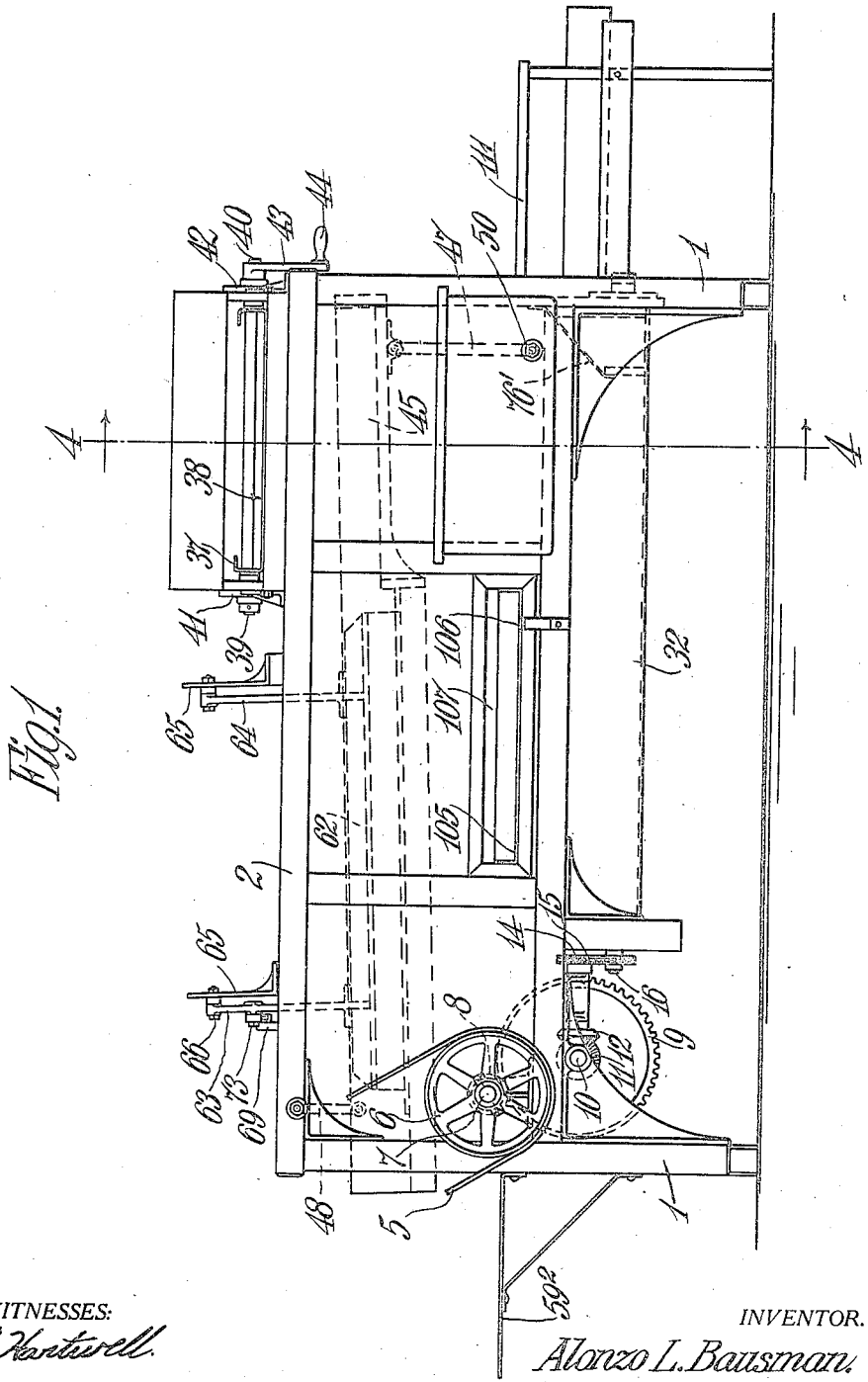

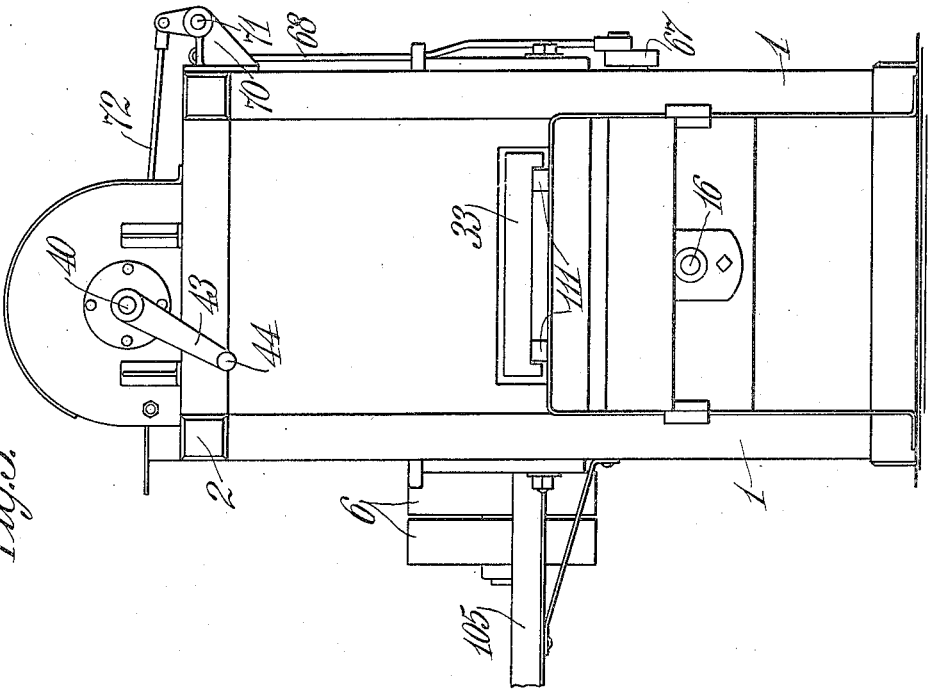

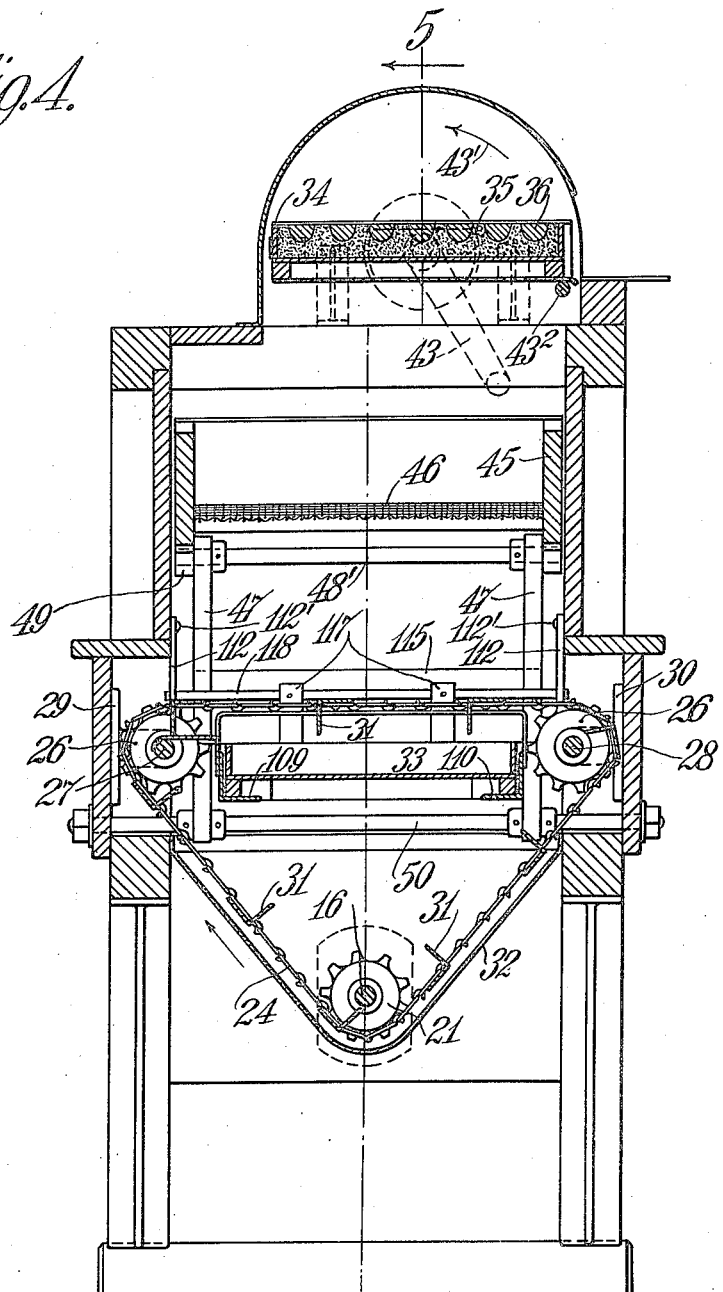

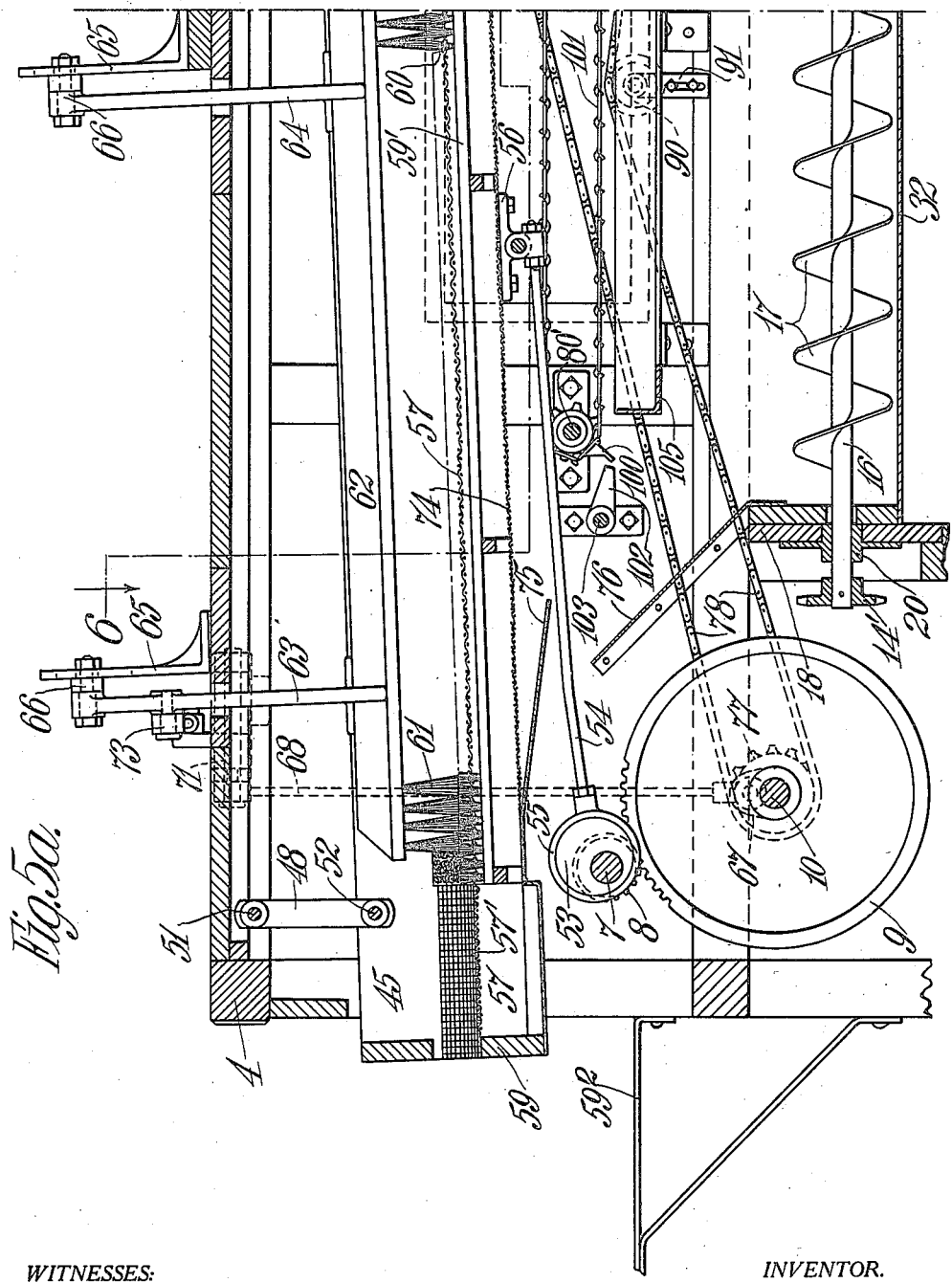

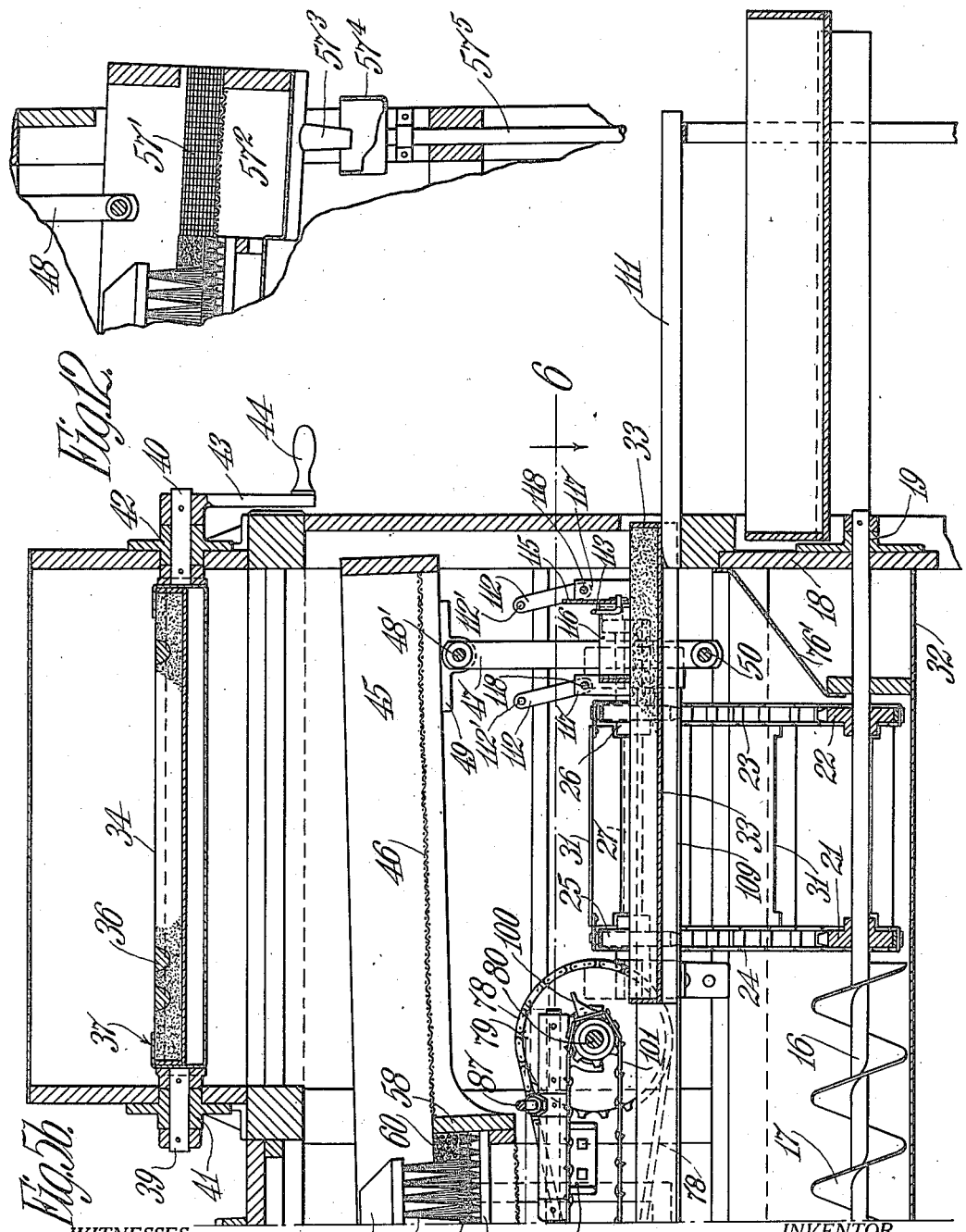

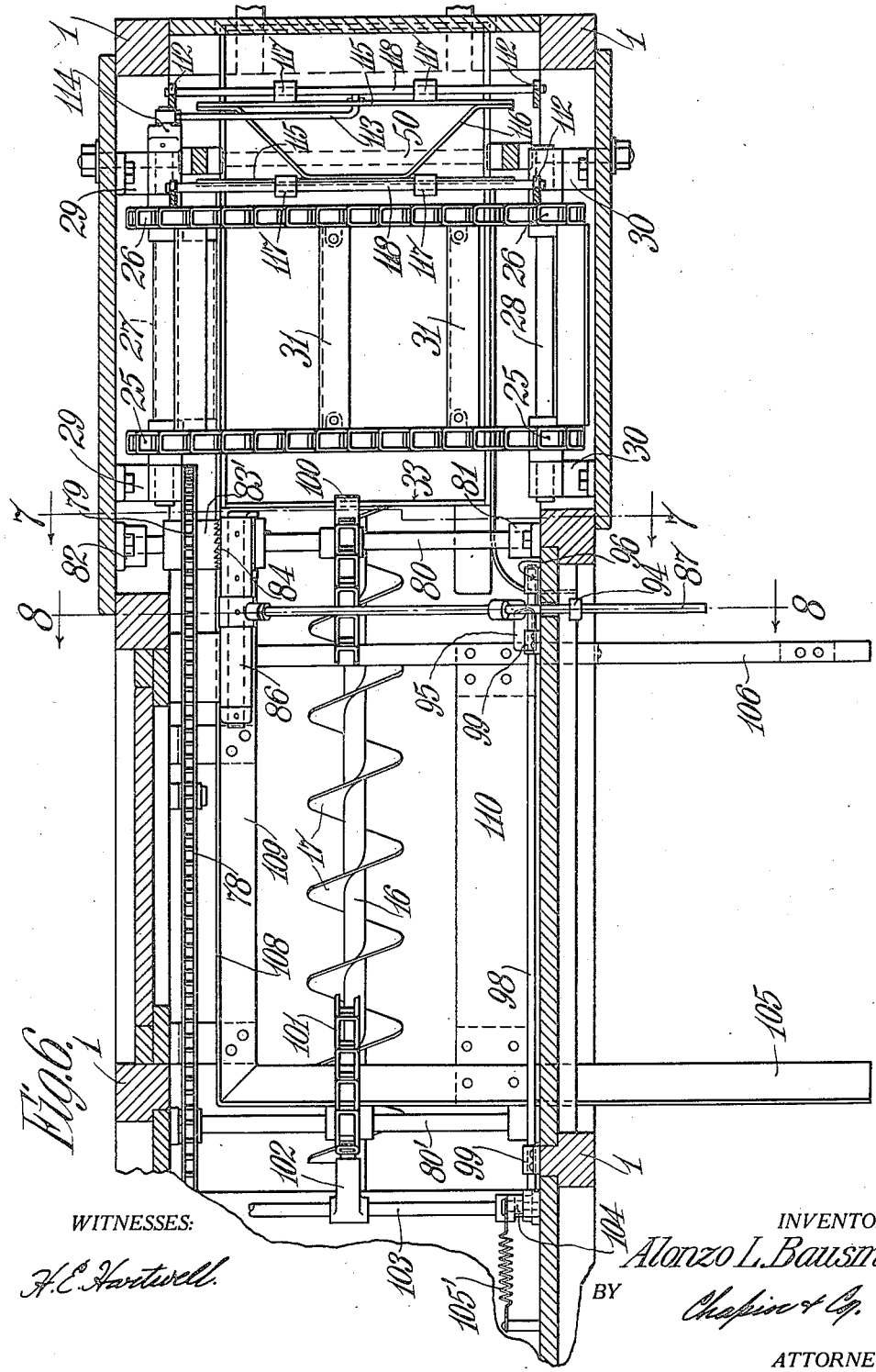

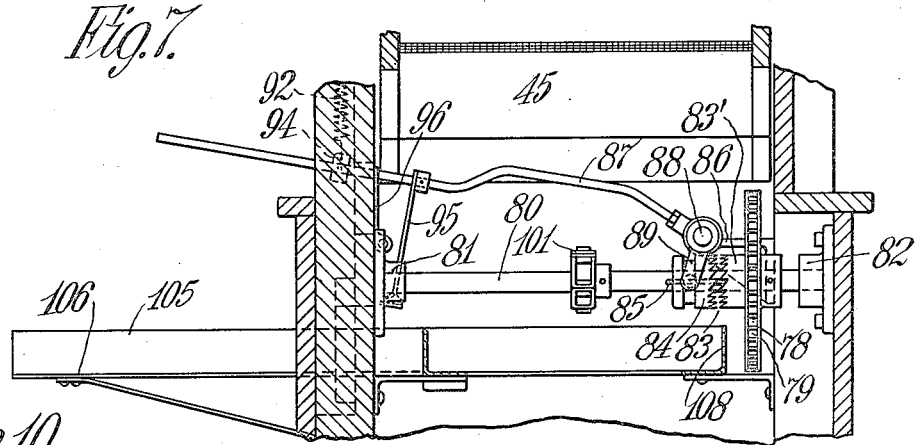
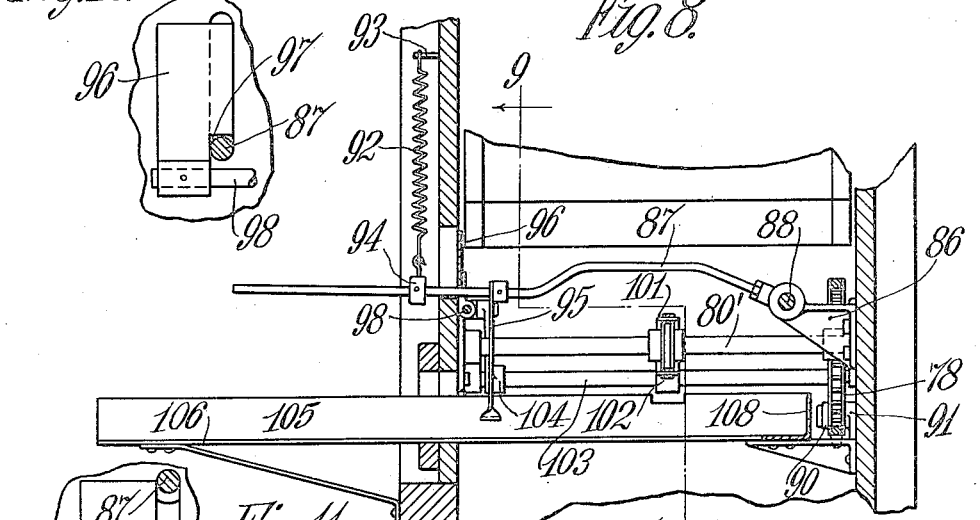
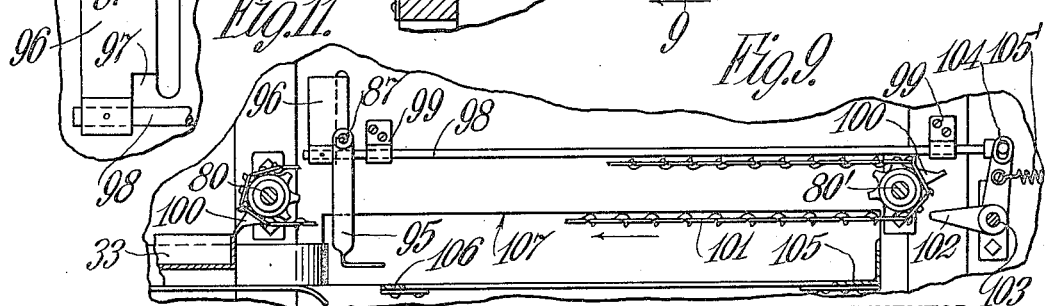

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

STARCH-MACHINE.

1,168,240.

Specification of Letters Patent.

Patented Jan. 11, 1916.

Application filed April 17, 1915. Serial No. 21,996.

*To all whom it may concern:*

Be it known that I, ALONZO LINTON BAUSMAN, a citizen of the United States of America, residing in the city of Springfield, county of Hampden, and State of Massachusetts, have invented certain new and useful Improvements in Starch-Machines, of which the following is a specification.

This invention relates to improvements in the so-called starch machines, wherein the starch used as a molding material for candies may be conveniently handled.

As is now well known in the art, the "centers" of coated candies are deposited in molds formed in starch. In practice, a tray filled with starch is formed with a plurality of mold recesses by a machine which in the art is termed a "printer." These recesses are subsequently filled with confectionery material of the desired kind, and, after the latter has hardened, the trays containing the candies and starch are emptied. The operation of emptying the trays takes place in the starch machine which also has the function of separating the starch from the candies and of cleaning the latter. The starch thus separated is again used to fill empty trays, and this invention is more particularly concerned with the latter process although provision is made for the separation of the candies from the starch as well as cleaning of the candies in substantially the usual manner.

There are now in use machines wherein trays are successively and automatically filled with starch, leveled, printed with molds, the molds filled, the trays emptied, and the contents separated without effort on the part of the operator. Such machines are necessarily elaborate and expensive and are within the means of large manufacturers only. Others in the trade doing business on a smaller scale cannot afford these wholly automatic machines as their volume of business is not sufficient to warrant the expense. However, these small manufacturers have the same problem of handling starch as a molding material for confectionery, and it is the province of this invention to provide relatively inexpensive apparatus for handling starch which, although not wholly automatic, furnishes an efficient and convenient labor saving device within the means of such manufacturers.

The object of this invention is to provide a starch machine, having means for the separation of candies from starch as well as for cleaning and deliverying the candies, in which trays containing candies molded in starch may be placed and emptied and in which empty trays may be placed to be filled and leveled with starch in a semi-automatic manner, the whole being characterized by relatively simple and inexpensive structure and for use intermittently when needed.

Referring to the drawings as illustrating one preferred embodiment of the invention: Figure 1 is a general side elevational view of the entire machine. Fig. 2 is an end elevational view looking from the left of Fig. 1. Fig. 3 is an end elevational view looking from the right of Fig. 1. Fig. 4 is a transverse vertical sectional view taken on the line 4—4 of Fig. 1, and looking in the direction of the arrows. Figs. 5$^a$ and 5$^b$ are longitudinal sectional views taken on the line 5—5 of Fig. 4 and looking in the direction of the arrows. These two views are drawn on separate sheets on account of scale considerations and should be imagined as joined one to the other. Fig. 6 is a sectional plan view taken on the line 6—6 of Figs. 5$^a$ and 5$^b$, and looking in the direction of the arrows. Fig. 7 is a transverse sectional view taken on the line 7—7 of Fig. 6, and looking in the direction of the arrows. Fig. 8 is a transverse sectional view taken on line 8—8 of Fig. 6, and looking in the direction of the arrows. Fig. 9 is a sectional elevation taken on the line 9—9 of Fig. 8, and looking in the direction of the arrows. Figs. 10 and 11 are detailed views of the clutch controlling latch. Fig. 12 is a detailed view of the outlet end of the brush lined sieve.

Referring to the drawings in detail: the framework of the machine comprises, in general, supporting legs 1, upper members 2 attached to the legs, and transverse members 3 and 4. Power is transmitted by a belt 5, which engages fast and loose pulleys 6 on a shaft 7. This shaft extends transversely of the machine and carries a pinion 8 which meshes with a gear wheel 9 mounted on the shaft 10. Fixed on the latter is a bevel-gear 11 which meshes with another bevel gear 12 secured to a short shaft 13. The latter drives by a sprocket wheel 14 and a sprocket chain 15, a second sprocket wheel 14' fixed to a longitudinally extending shaft 16. This shaft is located in the bottom part of the machine, as indicated in Figs. 5ª and 5ᵇ, and has a portion formed in a screw conveyer 17 for feeding the starch to the starch elevators to be described. This shaft is mounted in boxes 19 and 20 from depending hangers 18 and on the right hand end of the shaft are a pair of spaced sprocket wheels 21 and 22. Passing over these sprocket wheels are sprocket chains 23 and 24 which pass upwardly, and over their sprocket wheels 25 and 26. The latter are mounted on spaced parallel shafts 27 and 28 which are supported in bearings 29 and 30 from the walls of the machine. Secured to the sprocket chains 23 and 24 at suitable intervals are angularly shaped bars 31 which are designed to convey starch from a receptacle 32 upwardly and discharge it into empty trays 33, as they are brought into this position in a manner to be described.

Referring to Fig. 4 34 designates a tray filled with candy centers 36 molded in finely divided starch 35 which is to be emptied. This tray is held by means of the overhanging edges 37 of the tray supporting rack 38 as shown in Figs. 1 and 5ᵇ. Attached to this rack are the stub shafts 39 and 40, mounted in bearings 41 and 42, and fixed to the shaft 40 is a crank 43 which is attached to the shaft 40 which has a handle 44 thereon. By operating the handle 43 the contents of the tray 34 may be emptied into the receptacle 45 which has a sieve bottom, 46 whereby the greater part of the starch may pass directly into the starch receptacle 32 below. The receptacle 45 is pivotally supported by means of the links 47 and 48 at opposite ends of the machine, and the links 47 have a pivotal connection 48' with blocks 49 attached to the lower side of the receptacle. The lower end of the links 47 are mounted on a transverse shaft 50. The links 48 are pivotally attached by pins 51 and 52 to the frame and receptacle, respectively.

In order to reciprocate the sieve receptacle 45, the shaft 7 is provided with eccentric 53 which is connected by means of a link 54 and strap 55 to blocks 56 on the lower side of the receptacle. The oscillatory movement imparted to this receptacle permits the starch to be shaken through the sieve 46 into the receptacle 32 shown in Fig. 4. The candy centers 36 are caught by the sieve and, as this receptacle is arranged in an inclined position, they will be gradually moved downward toward the left hand end of the machine. The left hand end of this receptacle is provided with a second sieve 57 of larger mesh which extends between plates 58 and 59 and below the plane of the sieve 46. The sieve 57 is lined with tufts of bristles 60 which are mounted in a framework 59', and project upwardly through the sieve as shown in Figs. 5ª and 5ᵇ. Other downwardly projecting bristles 61 arranged to coöperate with bristles 60 are secured in a frame 62 which is pivotally supported by means of hangers 63 and 64 connected to brackets 65 at the points 66. In order to impart a transversely swinging movement of the bristle carrying frame 62, a crank 67 (see Fig. 2) is attached to the shaft 10 and the former is connected by a link 68 to one arm of a bell-crank lever 69 which is pivoted at 71 to a bracket 70. The other arm of the bell crank lever is connected by a link 72 to the hanger 63 at the point 73. It will, therefore, be seen that when the shaft 10 is operated a transversely swinging motion will be imparted to the framework 62 and bristles 61, which, in coöperating with the bristles 60, will thoroughly clean and remove any traces of the starch adhering to the candy cores 36.

When the crank arm 43 is rotated in order to empty the contents of the tray 34 the major portion of the starch will, as stated above, immediately fall onto and pass through the sieve 46, into the receptacle 32 below. The cores however are retained by this sieve and are caused to travel downwardly to the brush lined sieve 57. Here the candies are thoroughly brushed and the starch removed passes through the sieve 57 upon a second sieve 74 which is of relatively fine mesh. This sieve is designed to catch small pieces of the cores and thus prevent them from falling into the receptacle 32 with the starch. Located below the lower end of the sieve 74 is an inclined plate 75 to deflect the starch falling through this portion of the sieve onto a second plate 76 which terminates in the receptacle 32. The screw conveyer 17 located in this receptacle, forces the starch toward the right hand end of the machine where it is subsequently elevated and discharged into an empty tray 33, as indicated in Fig. 4.

76' is a starch deflecting plate at the opposite end of the machine.

Mounted on the shaft 10 is a sprocket wheel 77 which drives by a chain 78, a second sprocket wheel 79 secured to the shaft 80. This latter is mounted in bearings 81 and 82 secured to the opposite walls of the machine, as clearly shown in Fig. 6. The sprocket 79 has integrally formed thereon a clutch member 83.' Coöperating with the other is a clutch member 84 which has a sliding connection with the shaft 80 by means of a spline and groove construction 85. These mating elements 83' and 84 form a clutch 83. Pivotally mounted at 88 in a bracket 86 is an arm 87 which has a downwardly extending portion 89 to embrace the opposite sides of a groove in the clutch member 84 whereby the latter may be shifted into and out of engagement with the member 83' for starting and stopping the machine. Located below the lower travel of the sprocket chain 78 is an idler roller 90 that is adjustably mounted on a bracket 91 in order to maintain the sprocket chain at proper tension. The clutch operating arm 87 extends through an opening in the side of the machine as indicated in Fig. 9 and has attached thereto a coil spring 92, one end of which is connected to a pin 93 and the other to the block 94 on the arm 87. Depending from the arm 87 is a piece 95 the purpose of which is to prevent the insertion of a tray while another tray is being fed forward to the filling position above the receptacle 32. The arm 87 is adapted to be retained in its downward position by means of a latch 96 which has a notch 97 formed therein, to receive the arm 87 when the clutch members 83 and 84 are engaged. The plate 96 is attached to a rod 98 which is slidably mounted in the bearings 99 (see Figs. 6 and 9). When the parts are in the position shown in Fig. 8 the clutch is closed. In order to automatically release the clutch, the rod 98 is moved toward the left to withdraw the latch 96 and permit the arm 87 to be raised by the spring 92. This movement is accomplished by means of lugs 100 on a chain 101 which passes over sprocket wheels on the shafts 80 and 80' and travels in the direction of the arrow, (see Fig. 1). These lugs engage an arm 102 fixed on a transverse shaft 103. The latter bears another arm 104 which has a slot and pin connection with the right hand end of the longitudinal rod 98, as shown in Fig. 11. Attached to the arm 104 is a coil spring 105' which tends to hold the latch 96 against the arm 87.

Reference to Figs. 10 and 11 will show that, when the rod 98 is pushed by the action of the lug 100 on the arm 102, the arm 87 will be released from the notch 97 and will be moved upwardly by the spring 92 into the position shown in Fig. 11, whereby the clutch 83 is opened and the movement of the chain 100 stopped. When the operator wishes to re-start the chain 100, which feeds the empty trays to the filling position, he simply presses downward on the outer end of the arm 87, thus throwing the clutch 83, shown in Fig. 7, into locking engagement again. The operator before he pulls downward on the arm 87 pushes into the machine an empty tray by placing the same on runways 105 and 106. This tray enters the machine through an opening 107 and is pushed forward until it engages a vertical web 108. A lug 100 on the chain 101 then engages the side of the tray and moves it along trackways 109 and 110 into filling position over the receptacle 32, (see Fig. 5^b). In Fig. 9 a tray 34 has just been moved by means of the lug 100, toward the left. The other lug 100 at the right hand end of the figure is about to engage the arm 102 and effect the movement of the rod 98 to release the latch 96 from the arm 87 and open the clutch 83 to stop the chain 101. At the same time the rest of the machine continues in operation, that is to say, the screw conveyer 17 and elevating chains 23 and 24 operate continuously. A tray is shown in Fig. 6 in its filling position and in Fig. 9 an empty tray is shown. When an empty tray is moved by means of a projection on the chain 101 into its filling position the filled tray is moved out of the machine on to the runways or platform 111, in convenient reach of the operator, (see Fig. 5^b). As the filled tray is being moved out onto the platform 111, the surplus starch is automatically scraped off by a reciprocating leveler 115, which is actuated by a link 113, connected to a crank pin 114 on the shaft 27. The leveler consists of a frame formed of spaced parallel plates 115, each suitably secured to blocks 117, and tied together by a third plate 116. The blocks 117 are mounted on transversely arranged rods 118, which are supported by links 112 pivotally secured to the frame at 112'. (See Fig. 5^b).

After a tray has been filled with starch the depressions or recesses are formed therein by means of the "printer" for receiving the molten material which forms the candy centers 36 in a manner well known in the art. After the centers have hardened the tray is inserted in the rack 38, and its contents are emptied, as already explained, by manually turning the crank arm 43 in the direction of the arrow 43'. A stop 43² is employed to limit the extent of rotation of the tray. The emptied tray is then removed and inserted in the machine again through the opening 107 as already set forth.

Any pieces of the centers which may have been chipped off during the cleaning process fall into a receptacle 57² and pass by means of a spout 57³ into the receptacle 57⁴ and thence downwardly through a delivery pipe 57⁵. The cleaned candy cores 36, as they leave the sieve 57 pass along the portion 57', (see Fig. 5ª,) and fall into a suitable receptacle (not shown) which is placed on the brackets 59².

What I claim is:

1. A starch machine, comprising, in combination, a device to empty trays filled with candies and starch, means to separate the candies from the starch, a receptacle for starch arranged below said means, a trackway above the receptacle arranged to receive a tray to be filled, an elevator to convey starch from the receptable to a tray on the trackway, and semi-automatic means to move a tray along the trackway to a position below the elevator, said means involving a conveyer, a device operable at will to actuate the conveyer, and automatic mechanism to stop the conveyer after the tray has been moved a predetermined distance, said conveyer characterized by automatic operation in cycles which may be started manually by said device, when desired.

2. A semi-automatic starch machine, comprising, a reciprocatory sieve, a dumper adapted to empty trays filled with candies molded in starch upon the sieve, the latter arranged to separate the starch and candies, a receptacle below the sieve to receive starch falling therefrom, a trackway above the receptacle, an opening formed in the casing to permit an empty tray to be placed on the trackway, an elevator arranged to convey starch from the receptacle to a tray on the trackway, and means to move the tray from said opening to said elevator, said means comprising a conveyer having lugs to engage the tray, driving devices for the latter involving a clutch, a lever manually operable to actuate the clutch, a latch to hold the cluth in its moved position, and a device automatically operable by one of the lugs to release the clutch, all constructed and arranged so that the conveyer may be automatically operated in cycles which may be started by the operator at will and automatically terminated and reset for a subsequent cycle after the tray has been moved a definite distance.

3. A starch machine, comprising, means to separate candies and starch, a dumper above said means arranged to empty trays of candies molded in starch upon said means, a trackway below the latter, a receptacle below the trackway to receive starch from said means, mechanism to convey starch from the receptacle to a tray on the trackway, an opening adjacent said mechanism to permit a tray to be placed on the trackway, and means to move a tray so placed to said mechanism, comprising, a conveyer having lugs to engage the tray, means to drive the conveyer involving a clutch, a lever manually operable to actuate the clutch, a latch to hold the clutch in its moved position, a device automatically operable by one of said lugs to release the clutch after the tray has been moved to said mechanism, and means on said lever to prevent the insertion of a tray in said opening while the conveyer is in motion, all constructed and arranged so that the conveyer may be automatically operated in cycles which may be started by the operator at will and automatically terminated and reset for a subsequent cycle after the tray has been moved a definite distance.

ALONZO LINTON BAUSMAN.